April 14, 1970 A. B. WEBER 3,506,421
METHOD OF PRODUCING GLASS SPHERES
Filed Oct. 9, 1967
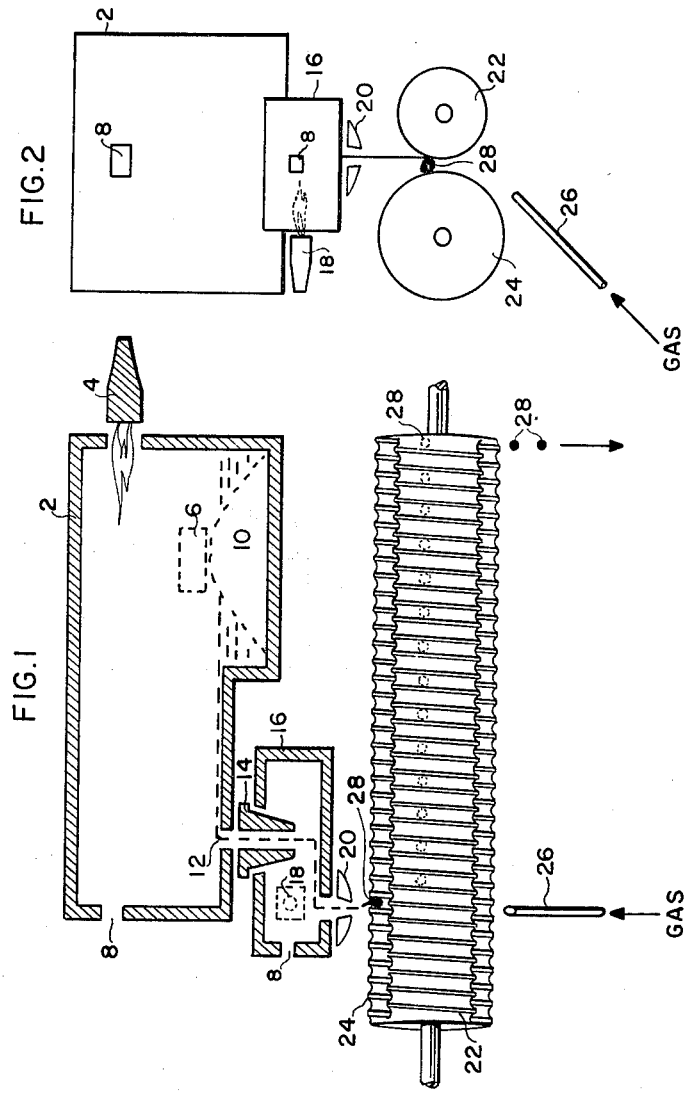
INVENTOR.
ANTON B. WEBER United States Patent Office 3,506,421
Patented Apr. 14, 1970

3,506,421
METHOD OF PRODUCING GLASS SPHERES
Anton B. Weber, Montclair, N.J., assignor to FMC Corporation, New York, N.Y., a corporation of Delaware
Filed Oct. 9, 1967, Ser. No. 673,841
Int. Cl. C03b 19/10
U.S. Cl. 65—21                                    3 Claims

ABSTRACT OF THE DISCLOSURE

Glass spheres are produced by continuously flowing a glass melt directly onto a pair of parallel, axially-spaced, rotating cylinders, each having a continuous, helical groove in its surface. The rims of the helical grooves sever the melt into glass gobs, and the gobs are rotated within the helical grooves of the rotating cylinders to form the glass spheres. A fluid barrier, produced by passing a gas stream upwardly, is maintained between the two cylinders to prevent substantial amounts of glass melt from falling through the space between the cylinders.

BACKGROUND OF THE INVENTION

Field of the invention

This invention relates to a process for producing spheres and spheroidal shapes from glass; the glass may be any inorganic product of fusion that has been cooled to a rigid condition without crystallization.

Description of the prior art

Glass spheres or spheroidal shapes can be produced by flowing molten glass having a viscosity of about $1 \times 10^3$ or $1 \times 10^4$ poise through an orifice, cutting the molten glass into gobs by cutter means and subsequently placing the gobs onto two parallel cylinders, axially spaced, which have continuous, helical grooves in their surfaces. As the cylinders rotate, the glass gobs are constantly rotated within the helical grooves of the rotating cylinders and worked into spherical shapes. These gobs move along the helical groove in a direction substantially parallel to the axis of the cylinders until the glass has hardened into a spheroidal shape. The spheroidal-shaped glass product then falls through a space between the cylinders and is allowed to cool further. Typical helical-cut cylinders useful for this purpose are described in U.S. Patent 1,164,718 issued to H. C. Hill, Dec. 21, 1915. Automatic cutter means useful in forming glass gobs from a molten glass is also described in U.S. Patent 2,422,413, issued to O. G. Hanlon, June 17, 1947.

One major difficulty with the process is that the cutters which shear off the glass gobs have to be replaced frequently because of rapid wear and changes in the diameter of the orifices therein. The high degree of wear is due to the metal cutters directly contacting the molten glass. The use of refractories in the cutters is not practical because of the extensive physical stress placed on the cutter by continuous, reciprocating movements.

Another problem is that the glass which is to be cut must have a critical working viscosity, nominally from about $1 \times 10^3$ to $1 \times 10^4$ poise, in order to be properly sheared into gobs. If the glass is less viscous, the glass will not properly shear from the remainder of the glass melt. Alternately, if the glass is too viscous, the proper amount of glass is not sheared into a gob. Accordingly, the temperature of the glass must be controlled to within very specific limits to obtain this degree of viscosity. Further, certain glasses, such as polyphosphate glasses which crystallize at lower temperatures than conventional silica glass, cannot be used in this process because the glasses commence crystallizing at the temperatures required to yield proper cutting viscosities. This creates serious problems, since a portion of the non-silica glasses, e.g., polyphosphate glasses, crystallize into undesired, short-chained compounds that are opaque, and do not have the water-treating properties of desirable phosphate glasses. Further, these glasses crystallize at the furnace orifice and gradually build up on the orifice and change its effective diameter.

Another difficulty is that the production rate of glass spheres is limited to the number of gobs which can be sheared by the cutter. The cutters in turn must wait for the full gob of glass to flow through the cutter orifice before they can shear it. Since the viscosity of the melt is quite high, a relatively long period of time is required to produce each glass gob. As a result, maximum production is severely limited.

OBJECTS OF THE INVENTION

It is an object of the present invention to produce glass spheres and spheroids by a more simplified process that eliminates glass cutting means used to sever molten glass into glass gobs.

It is a further object of the present invention to produce glass spheres from glass melts having viscosities substantially below that used to sever the molten glass into glass gobs by cutting means.

It is still another object of the present invention to produce glass spheres by a process whose production is not limited to the rate at which glass cutting means can sever molten glass into glass gobs.

These and other objects will be apparent from the following description of the invention.

SUMMARY OF THE INVENTION

I have now found that spheres and spheroidal shapes of glass can be produced by continuously flowing molten glass having a viscosity of 0.01 to 100 poise onto a pair of axially-spaced rotating cylinders each having a continuous, helical groove in its surface, passing a gas stream upwardly between said cylinders to maintain an upflowing fluid barrier, thereby preventing substantial amounts of said molten glass from falling between said cylinders, severing the molten glass that falls on said cylinders by the rims of said helical grooves into glass gobs, subsequently rotating said gobs within the helical grooves of said cylinders to form spherical glass shapes and moving said spherical glass shapes within the helical grooves in a direction substantially parallel to the axis of said cylinders until cooled into a rigid, spherical shape.

BRIEF DESCRIPTION OF THE DRAWING

In the drawing a diagrammatical front view is shown in FIG. 1 of molten glass being poured from a furnace directly onto a set of helical-grooved cylinders having a fluid barrier between said cylinders, the molten glass being separated into gobs by the helical grooves, and worked into spherical shapes.

FIG. 2 is a side view of FIG. 1.

DESCRIPTION OF THE INVENTION AND THE PREFERRED EMBODIMENTS

In carrying out the present invention a glass mix is added to a furnace and heated to its melting point, normally above 1000° C. The glass can be conventional, silica glass made up principally of silica, soda ash and lime, or it can be other inorganic products of fusion, e.g., the polyphosphate glasses. If the polyphosphate glasses are utilized, these can be of the type that contain $P_2O_5$ and $Na_2O$ values, such as Hexaphos (made up of 67% by weight $P_2O_5$ and 33% by weight $Na_2O$). Other polyphosphate glasses, such as the Duraphos glasses, can also be used which contain, in addition to $P_2O_5$ and $Na_2O$ values, other additives such as CaO and /or $Al_2O_3$ values. Examples of such glasses are Duraphos No. 225 which contains 67% by weight $P_2O_5$, 27.75% $Na_2O$, 3.5% CaO and 1.75% $Al_2O_3$ (based on the oxides).

After a glass batch has been melted, the melt is passed through an orifice in the furnace into a temperature conditioning section in which the glass is maintained at the desired temperature, and the rate of flow is controlled. The molten glass, having a viscosity of 0.01 to 100 poise, pours from this section of the furnace directly onto a set of parallel, axially-spaced, rotating cylinders. These cylinders have a continuous, helical groove in their surfaces approximately the diameter of the desired sphere. Normally, the cylinders are of unequal diameter and rotate in the same direction.

Beneath the pair of cylinders, particularly where the molten glass strikes the surface of the cylinders, a gas stream is passed upwardly between the two cylinders to form a fluid barrier that resists the flow of molten glass between the two cylinders. The velocity of the gas stream should not be so high as to fluidize the molten glass so as to lift it and prevent frictional contact of the glass and the helical grooves in the surface of the cylinders. The intensity of the fluid barrier should be such as to merely prevent the ready flow of molten glass between the rotating cylinders. Any nonflammable gas can be used for this purpose; compressed air is the cheapest and most convenient gas to use.

As the continuous stream of molten glass strikes the surface of the cylinders, the adjacent rims of the helical grooves which are on the surface of the cylinders constantly sever the molten glass into gobs. This results because the adjacent rims of the two rotating cylinders constantly separate portions of the molten glass by accumulating and pulling away portions of the molten glass from the stream that is deposited on the cylinder. These individual gobs of glass then rotate about constantly varying axes within the helical grooves of the two cylinders. The gobs remain fixed in the space between the two cylinders, and as the cylinders turn, the helical grooves work the glass gobs into spherical shapes and gradually move the shapes in a direction substantially parallel to the axes of the cylinders until the glass commences cooling into a rigid, spherical shape. Thereafter, the glass sphere can be discharged from the cylinders onto cooling and annealing means in order to completely cool the glass sphere.

In continuous operation, cylinders having one helical groove normally have a spherical glass shape in every groove between the two cylinders, since a gob of glass is cut with each revolution of the cylinders. With multiple helical grooves, more than one gob is cut per revolution. The rate of production of glass spheres is limited only by the rate at which the gobs can be worked by the cylinders.

The present invention will now be described by reference to the drawing which is a diagrammatical representation of the process. In the drawing a typical glass melting furnace 2 is shown equipped with a burner 4, a side feed port 6 and view and venting ports 8. The glass batch, which is in the form of a homogeneous powder 10 is introduced into the furnace 2 through side port 6. After the glass batch has melted, the melt 12 pours through orifice 14 into a temperature condition section 16 equipped with a separate burner 18. In section 16 the glass melt 12 is conditioned to yield the desired viscosity prior to being passed out through control orifice 20. Orifice 20 is a variable size orifice used to control the rate of flow of glass melt from the furnace. The molten glass 12, having the proper viscosity, then passes through orifice 20 and pours onto two cylinders 22 and 24. Each of these cylinders 22 and 24 has a continuous, helical groove in its surface. Beneath cylinders 22 and 24 and located directly below the location of the fluid stream passing downwardly onto the cylinders is at least one gas carrying means 26. The gas carrying means 26 passes a gas stream upwardly between cylinders 22 and 24 to form a fluid barrier which resists the flow of molten glass between the two cylinders. As the cylinders rotate, a gob of glass 28 is separated from the downward flowing stream of glass by the rims of the rotating cylinders 22 and 24. The gobs 28 are then rotated by the helical grooves until they are discharged at the end of the cylinders 22 and 24 for subsequent further cooling and annealing by means not shown. During the movement of the gobs 28 in a direction substantially parallel to the axis of the cylinders, the glass is cooled sufficiently to retain a rigid, spherical shape before it is discharged from the cylinder means 22 and 24.

The following examples are given to illustrate the present invention and are not deemed to be limiting thereof.

Example 1

A phosphate glass mix, Duraphos No. 227, which is made up of 67% $P_2O_5$, 21% $Na_2O$, 8% CaO and 4% $Al_2O_3$ was placed in a feed hopper and was continually fed into a melting furnace by means of a vibratory feeder at a rate of 25 pounds per hour. The furnace contained a heel of approximately 400 pounds of molten Duraphos No. 227, maintained at a temperature above about 1000° C. The powdered feed was constantly melted in the furnace, and 25 pounds per hour of melt was discharged through the furnace via an orifice. The temperature of the melt stream was controlled between about 620 to 720° C. at which temperature it had a consistency of ordinary syrup (a viscosity of about 1 to about 10 poise). The molten glass stream flowed downwardly from the orifice and was deposited between two cylinders, one having a diameter of about 5½ inches, and the other a diameter of about 5 inches, both cylinders being 27½ inches long. The cylinders had helical grooves cut in their surfaces sufficiently spaced apart to produce ½ inch diameter glass spheres. An air stream was directed upwardly from beneath the two cylinders to form a fluid barrier that opposed the gravitational flow of the melt between the cylinders. The intensity of the air stream was adjusted so as to prevent the ready flow of molten glass between the cylinders without lifting the glass from the surface of the cylinders. The cylinders were rotated at 72 r.p.m. and with each rotation a gob of glass was separated from the molten stream and traveled in a direction parallel to the axis of the cylinders. Spheres were produced with substantially 100% efficiency and substantially each groove of the cylinder contained one sphere when the system reached equilibrium. The loss of melt between the cylinders was limited to a few, small, accumulated pieces of glass. During a 24 hour continuous operation, 600 pounds of marbles were produced. After traveling the full length of the two cylinders, the spheres were dropped into five gallon steel pails insulated with asbestos cloth.

Example 2

A run similar to Example 1 was made with Hexaphos glass (67% $P_2O_5$, 33% $Na_2O$) except that the melt flow rate was 15 pounds per hour, and the furnace was charged at 5 minute intervals with the Hexaphos mix. In this case the cylinders were revolved at 62 r.p.m. and continuous production of spheres was obtained in the same manner as in Example 1.

Example 3

A run similar to Example 2 was carried out using crushed soda-lime glass cullet. The temperature of the molten glass stream was maintained above 1200° C. to yield a viscosity between 0.1 and 10 poise. Continuous production of spheres was obtained in the manner of Example 2.

Pursuant to the requirements of the patent statutes, the principle of this invention has been explained and exemplified in a manner so that it can be readily practiced by those skilled in the art, such exemplification including what is considered to represent the best embodiment of the invention.

What is claimed is:

1. Process for producing glass spheres and spheroidal glass shapes wherein a molten glass, having a viscosity of about 0.01 to about 100 poise, is flowed onto a pair of axially-spaced rotating cylinders each having at least one continuous, helical groove in its surface, passing a nonflammable gas upwardly between said cylinders to maintain an upflowing fluid barrier and substantially prevent said molten glass from falling between said cylinders, constantly severing said molten glass on said cylinders into glass gobs by means of the adjacent rims of said helical grooves, said rims cutting into and separating a portion of said molten glass as said cylinders are rotated, rotating said glass gobs within the helical grooves of said cylinders to form spheroidal glass shapes and moving said shapes within the helical grooves in a direction substantially parallel to the axis of said cylinders until cooled into a rigid shape, further cooling said shapes and recovering spheres and spheroidal glass shapes.

2. Process of claim 1 wherein the glass spheres and glass spheroids are made up from a polyphosphate glass containing as essential components $P_2O_5$ and $Na_2O$ values.

3. Process of claim 1 wherein said nonflammable gas is air.

References Cited

UNITED STATES PATENTS 1,601,699   9/1926   Miller _____ 65—182 X

S. LEON BASHORE, Primary Examiner

R. L. LINDSAY, JR., Assistant Examiner

U.S. Cl. X.R.

65—143, 182